May 12, 1925.
R. D. ELLIOTT
1,537,919
METHOD OF LOCATING THE LEVEL AT WHICH WATER ENTERS A WELL
Filed Sept. 15, 1921
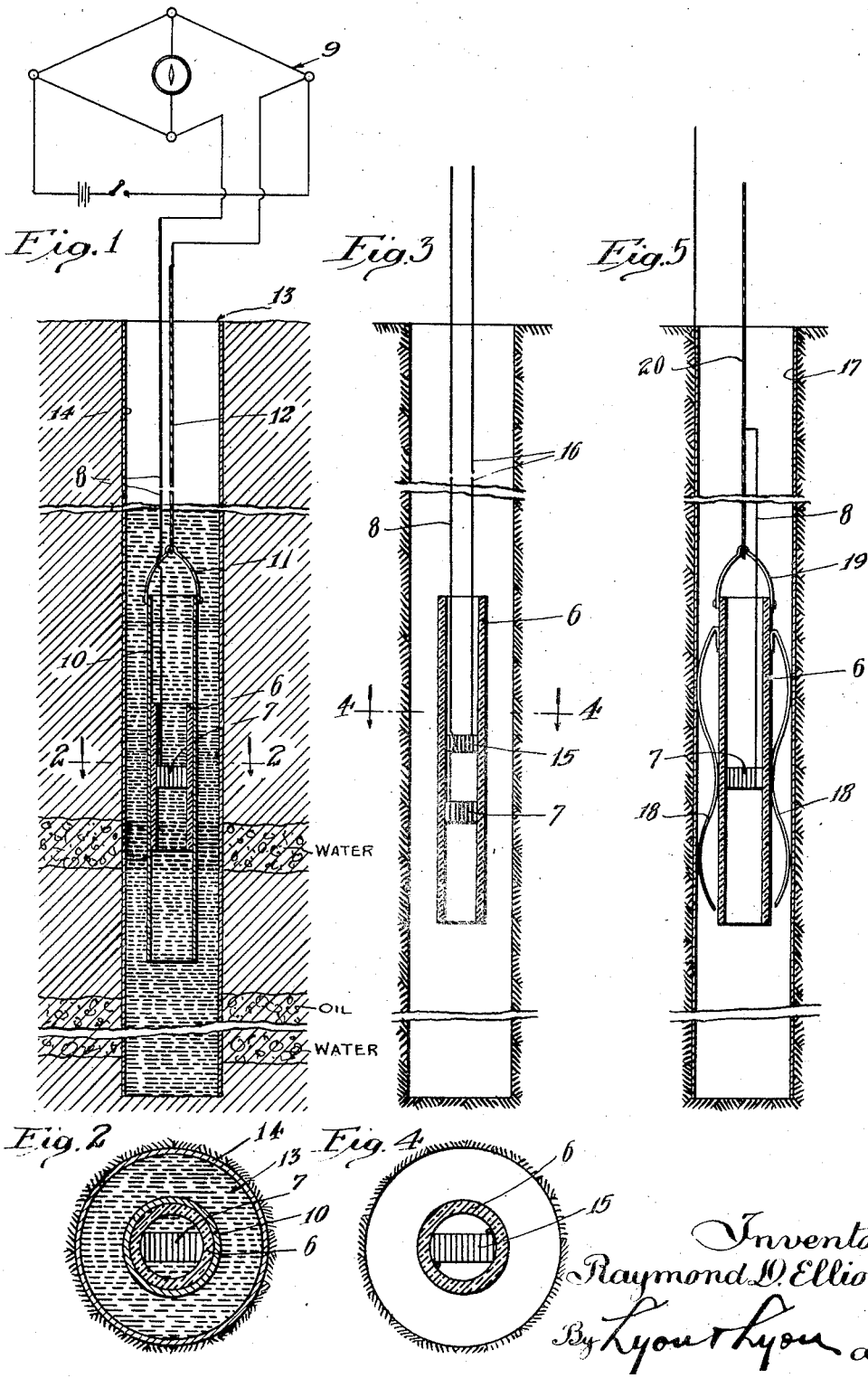

Patented May 12, 1925.

1,537,919

UNITED STATES PATENT OFFICE.

RAYMOND D. ELLIOTT, OF WHITTIER, CALIFORNIA, ASSIGNOR OF ONE-HALF TO EDMUND J. YOUNG, OF BERKELEY, CALIFORNIA.

METHOD OF LOCATING THE LEVEL AT WHICH WATER ENTERS A WELL.

Application filed September 15, 1921. Serial No. 500,993.

*To all whom it may concern:*

Be it known that I, RAYMOND D. ELLIOTT, a citizen of the United States, residing at Whittier, in the county of Los Angeles and State of California, have invented new and useful Improvements in Methods of Locating the Level at Which Water Enters a Well, of which the following is a specification.

This invention relates to a method and apparatus whereby may be ascertained the level at which water enters a well. The invention is especially useful in connection with oil wells, since it is necessary to know where the water enters the well in order to seal the wall of the well at the point of entrance of the water.

With this invention the mud and water or oil in the well are first displaced by filling the well with water having a known and constant electrical conductivity. Then some of the water is removed to lower the water level sufficiently to permit the entrance of water from the water bearing stratum. When a small amount of external water is known to have entered the well, by raising of the level of the water in the well, then an electric current is sent from one electrode to another in the well while one of the electrodes is being lowered. Readings are then taken by a suitable electrical instrument while the electrode is being lowered, indicating the resistance between the electrodes. A change in the resistance is indicative of the entrance of the electrode into a liquid body of different electrical conductivity than that through which it has been descending. The depth at which the difference in conductivity of the liquid column in the well is found will indicate the level at which the water is entering the well.

An object of the invention is to determine in an easy and reliable manner the approximate level at which the water enters the well.

The method may be performed in part by any suitable apparatus, and I have shown in the accompanying drawings three forms of apparatus capable of performing some of the operations involved in the new method.

Figure 1 is a vertical section of a well with one form of my apparatus inserted therein for ascertaining the relative conductivity at different levels of the liquid contents of the well, a portion of the well being broken away to contract the view and the view being more or less diagrammatic.

Figure 2 is a plan section on line indicated by 2—2 Figure 1.

Figure 3 is a sectional elevation of a well with a different form of apparatus inserted therein for testing the conductivity of the well contents at different levels.

Figure 4 is a plan section on line indicated by 4—4 Figure 3.

Figure 5 is a sectional elevation of a well with a still different form of apparatus inserted therein for ascertaining the electrical conductivity of the contents of the well at different levels.

The different apparatus shown in the drawings are alike in some respects, and the elements that are alike will be described first: A tubular electrical insulator is indicated at 6 and mounted therein is an electrode 7 connected by a conductor 8 to Wheatstone's bridge 9, which is one form of device that may be employed for ascertaining the resistance in the electric circuit which is to be tested. It is not believed necessary to describe Wheatstone's bridge in detail herein, since electrical engineers are familiar with the construction and use of such a device. This Wheatstone's bridge is shown only in Figure 1, but it is understood that the same device or one that answers the same purpose forms a part of the apparatus shown in Figures 3 and 5.

Now referring particularly to Figure 1, the tubular insulator 6 is mounted within a tubular electrode 10 having a bail 11 at its upper end hung from a suitable cable 12, by which the tubular electrode 10 and the parts mounted therein are raised and lowered in the well 13. In this instance the bail 11 and cable 12 are electrical conductors and the cable 12 is connected with Wheatstone's bridge 9.

Though, in Figure 1, the well casing 14 is shown as extending to the bottom of the well, it is understood that this form of the invention can be used to advantage in an uncased portion of the well hole, as is often necessary.

Now referring to Figure 3, there is mounted within the tubular insulator 6 a second electrode 15 from which leads a conductor 16 which is to be connected as in Figure 1 to Wheatstone's bridge or any other suitable device for ascertaining the resistance in the circuit. Thus it will be seen that in Figure 1, one electrode is tubular and external of the insulator tube 6, permitting the well liquid to pass through said electrode; while in Figure 3 both electrodes are positioned within the tubular insulator. In both Figures 1 and 3 the object of the insulator 6 is to maintain the electrodes at a fixed and constant distance from one another so that the resistance between them will only vary according as the resistance of the medium in which the electrodes are immersed.

Now referring to Figure 5, the casing 17 of the well constitutes one of the electrodes and it is external of the insulator tube 6 the same as in Figure 1. Since it is advisable to maintain the electrode 7 at a fixed distance from the electrode 17, it is preferable to employ suitable centering means for the insulator 6 and, in this instance, such centering means are in the form of outwardly bowed springs 18 secured at one end to the insulator 6 and arranged so that the outwardly bowed portion of the springs may bear against the well casing 17 to hold the insulator 6 concentric with said well casing.

The upper end of the insulator 6 is provided with a bail 19 hung from a cable 20, which, if desired, may be an electrical conductor, and, when such is the case, the conductor 8 will be connected with the cable 20, thus minimizing the number of wires necessary to lower into the well.

With any of the apparatus above described the new method is performed as follows: The mud and the liquid contents of the well will be displaced therefrom by filling the well from the bottom up with water of a well known and constant salt content. That is to say the water column thus established will have a certain predetermined degree of resistance to the passage of an electric current therethrough between relatively fixed points in said water. Then some of the liquid will be removed from the well to cause the liquid level to lower to a point that will permit the entrance of water from the water bearing stratum. This point is, of course, below the water table but not below the level where the water is entering from the stratum. The rising water level in the well, as the external water comes in, indicates that such water is entering and when a comparatively small amount of this external water is known to have entered the well, the conductivity cell, as I shall so term it, which has been described above, connected with Wheatstone's bridge 9, an ammeter or any other suitable device for ascertaining the resistance in the circuit, is lowered and readings are made at close intervals to ascertain if there be any difference in the resistance of the circuit as the conductivity cell penetrates deeper into the liquid in the well.

As soon as a change in the degree of resistance is shown by the Wheatstone's bridge, the operator is made aware that at least one of the electrodes has entered a portion of the liquid column of different salt content than that of the liquid with which the well was charged, at the beginning of the test. The operator will ascertain the exact level at which the change in resistance occurs by measuring the length of cable required to lower the electrodes to that level. Since very little external water from the strata has entered the well up to this time, it is clear that the operator is enabled to determine within a comparatively slight distance the actual level at which the water enters the well. If the well is an oil well it is advisable to prevent the entrance of water from the formation, and the operator will then seal off the water by any of the well known methods in the oil well drilling art, not necessary to be described in detail herein.

In Figure 1, the resistance will vary between the electrodes 7, 10 when that portion of the electrode 10 adjacent the lower end of the insulator 6 is immersed in a liquid of different salt content than that in which the electrode 7 is immersed. In Figure 3 the electrode 7, being at a lower level than the electrode 15, will enter the liquid column of different salt content before the electrode 15, and the change of resistance between said electrodes will then be noted.

In Figure 5 the electric current passes between the electrode 7 to the well casing through the insulator 6, and a difference in conductivity of the liquid in the well can be noted when the portion of different conductivity is slightly above the level of the electrode 7.

When the well is provided with a casing extending to the level which is to be tested for the entrance of water, it is clear that the conductivity cell may be provided with but one electrode, the casing itself constituting the second electrode, as in Figure 5; and that, if there be no casing in the well, or if the casing does not extend to the level which is to be tested for the entrance of water, the conductivity cell will comprise the necessary two electrodes, as in Figure 1 or Figure 3.

I claim:

1. In the method of locating the level at which water enters a well, the combination of steps consisting in displacing the contents of the well by filling the well from the bottom up with a liquid of known electrical resistance, then withdrawing sufficient of the liquid from the well to permit the entrance of water from the water bearing stratum, and then testing the electrical conductivity of the liquid column in the well at successive levels until a level is ascertained at which the electrical conductivity of the liquid column is different than that of the displacing liquid.

2. In the method of locating the level at which water enters a well, the combination of steps consisting in displacing the liquid found in the well by filling the well from the bottom upward with a liquid of a different electrical conductivity than the water known to be entering the well, then withdrawing sufficient of the displacing liquid from the well to permit water to enter from the water-bearing stratum, and then testing the electrical conductivity of the liquid in the well through a constant distance at successive levels.

3. The method of locating the position of water bearing strata in bore holes which consists in producing within the bore hole a column of liquid presenting sharp difference in saline concentration between the liquid opposite the water bearing strata and the rest of the liquid in the bore hole and measuring the electrical conductivity of the liquid at different parts of the column, in situ in the bore hole to determine the location of the water bearing strata.

4. The method of determining the location of a water bearing stratum in a bore hole in which a watery fluid is present from such stratum, which comprises introducing into the bore hole at the lower portion thereof, of, aqueous liquid of predetermined salinity in quantity sufficient to displace the natural watery fluid above referred to from the bore hole by such introduced aqueous liquid allowing watery fluid to enter said bore hole from such stratum, then making successive measurements of saline concentration in situ at different levels in the resulting liquid column remaining in the bore hole.

5. A process as set forth in claim 4 in which the measurement of saline concentration is effected by measurement of the relative electrical resistance at different levels in the said column.

6. The method of determining the location of a water bearing stratum in a bore hole in which water is present from such stratum which comprises introducing into the bore at the lower portion thereof, water of different saline concentration from that of the water in the water bearing stratum so as to produce in the bore hole a water column of different saline concentration from the water in the water bearing stratum, allowing water from said stratum to enter the bore hole, and then making successive measurements of saline concentration in situ at different levels in the resulting water column remaining in the bore hole.

7. A process as set forth in claim 6 in which measurement is made of the relative electrical resistance at different levels in the said column.

8. The method of determining the location of water bearing strata which comprises filling the well with water of substantially uniform saline concentration, then lowering the level of the liquid in the well sufficiently to allow water to flow into the well from a water bearing stratum and thereby produce opposite to said stratum a zone of substantially modified saline concentration, and thereafter making a series of electrical conductivity determinations at many heights in the liquid in said well, to determine the location of said zone.

9. The method of determining the location of water bearing strata in bore holes for oil and gas production which comprises producing a column of liquid in the bore hole, the liquid initially having—and portions of the height thereof retaining—a substantially uniform saline concentration, and allowing therein for the production of a zone of substantially modified saline concentration at about the level of a water bearing stratum, and measuring in situ in the bore hole, the saline concentration at a series of points in the height of said column to determine the location of said zone of modified saline concentration.

10. In the process of the last preceding claim, the steps of determining the relative concentration by measuring the electrical resistance of the liquid.

Signed at Los Angeles, California this 29th day of August 1921.

RAYMOND D. ELLIOTT.

Witnesses:
GEORGE H. HILES,
L. BELLE WEAVER.